United States Patent
Hamaguchi et al.

(10) Patent No.: US 9,751,764 B2
(45) Date of Patent: Sep. 5, 2017

(54) CARBON MATERIAL PRODUCTION METHOD AND CARBON MATERIAL

(71) Applicant: KABUSHIKI KAISHA KOBE SEIKO SHO (KOBE STEEL, LTD.), Kobe-shi (JP)

(72) Inventors: Maki Hamaguchi, Hyogo (JP); Shohei Wada, Hyogo (JP)

(73) Assignee: Kobe Steel, Ltd, Kobe-shi (JP)

( * ) Notice: Subject to any disclaimer, the term of this patent is extended or adjusted under 35 U.S.C. 154(b) by 0 days.

(21) Appl. No.: 14/913,914

(22) PCT Filed: Sep. 9, 2014

(86) PCT No.: PCT/JP2014/073806
§ 371 (c)(1),
(2) Date: Feb. 23, 2016

(87) PCT Pub. No.: WO2015/037583
PCT Pub. Date: Mar. 19, 2015

(65) Prior Publication Data
US 2016/0200576 A1    Jul. 14, 2016

(30) Foreign Application Priority Data
Sep. 11, 2013 (JP) ................................. 2013-188208

(51) Int. Cl.
*C01B 31/02* (2006.01)

(52) U.S. Cl.
CPC .................................. *C01B 31/02* (2013.01)

(58) Field of Classification Search
CPC ..................................................... C01B 31/02
See application file for complete search history.

(56) References Cited

U.S. PATENT DOCUMENTS 4,181,502 A * 1/1980 Weber .................... C10B 53/08
                                                                     201/21
4,259,083 A * 3/1981 Ignasiak .................. C10L 9/06
                                                                     201/24

FOREIGN PATENT DOCUMENTS

| JP | 2001-26791 A | 1/2001 |
| JP | 2009-120464 A | 6/2009 |
| JP | 2009-144130 A | 7/2009 |
| WO | WO 2011/096405 A1 | 8/2011 |
| WO | WO 2013/129607 A1 | 9/2013 |

OTHER PUBLICATIONS

International Search Report and Written Opinion of the International Searching Authority issued Nov. 11, 2014 in PCT/JP2014/073806 (with English translation).

* cited by examiner

*Primary Examiner* — Stuart Hendrickson
(74) *Attorney, Agent, or Firm* — Oblon, McClelland, Maier & Neustadt, L.L.P.

(57) ABSTRACT

A method for producing a carbon material including an oxidation step of oxidizing an ashless coal, a forming step of mixing an oxidized ashless coal obtained in the oxidation step and an unoxidized ashless coal and forming a mixture thereof, and a carbonization step of carbonizing a formed body obtained in the formation step. Percentage of increase in oxygen of the oxidized ashless coal obtained in the oxidation step is from 2.0 to 10.0%. A mixing ratio of the oxidized ashless coal in the forming step is from 60 to 95 parts by mass per 100 parts by mass of a total of the oxidized ashless coal and the unoxidized ashless coal.

8 Claims, 1 Drawing Sheet

CARBON MATERIAL PRODUCTION METHOD AND CARBON MATERIAL

TECHNICAL FIELD

The present invention relates to a method for producing a carbon material, more specifically, a method for producing a carbon material having a high purity and a high density and being used as a structural member, an electrical or electronic material, a metal reducing agent, etc., and a carbon material.

BACKGROUND ART

A high-density carbon material is excellent in the heat resistance and chemical stability, and electrically conductive and therefore, is widely used as a structural member or an electrical or electronic material. In addition, since carbon exhibits a capability of reducing many metal oxides at a high temperature, the carbon material is also used as a metal reducing agent for refining titanium or the like.

As the method for producing a high-density carbon material, there is known a method where an aggregate component having a high carbon content and undergoing carbonization without melting, such as coke, and a binder component having thermoplastic properties and capable of binding aggregates with each other and moreover, being carbonized, such as coal tar pitch, are mixed and the mixture is formed, followed by subjecting to a heating (carbonization) treatment at a high temperature, thereby achieving the carbonization thereof. This method has a problem that the actual carbon ratio of the binder component is low, and one carbonization treatment allows for the presence of a void, leading to a carbon material having a small density. Accordingly, the carbon material after the carbonization treatment is impregnated with the binder component and again treated for carbonization and is necessary to be densified by repeating such a process many times. In turn, the production process of a high-density carbon material becomes cumbersome, and the production also takes a long period of time, as a result, the productivity is low and the high-density carbon material is expensive.

As the method for producing a high-density carbon material without use of a binder, a high-density carbon material using a carbon raw material having self-sinterability has been proposed. The self-sinterability is such a property that the material can be formed without addition of a binder component and when it is heat-treated, it is carbonized while maintaining the shape.

As a representative example of the carbon material having self-sinterability, a mesocarbon microbead is known.

Recently, from the standpoint of enhancing the quality in various applications, the content of impurities (so-called ash) other than carbon in the carbon material is required to be small, but since conventional carbon raw materials have a large impurity content, it has been difficult to provide a high-purity carbon material.

As regards a carbon raw material having a small impurity content, use of ashless coal containing substantially free of ash is being studied (for example, Patent Document 1). However, ashless coal has high thermal fluidity and has a property of melting at 200 to 300° C. irrespective of the grade of the raw material coal. In addition, ashless coal has a property of expanding when it is heated at around 400° C. Therefore, when a formed body obtained using ashless coal is carbonized, vigorous foaming occurs due to high-temperature heating to involve expansion, giving rise to a problem that cracking or chipping is produced in the carbon material, powdering is caused to fail in maintaining the shape of the formed body, or the carbon material becomes porous and is decreased in the density.

To solve such a problem, the present inventors have proposed a technique for modification of ashless coal (Patent Document 2). In this technique, the volatile matter content is adjusted to fall in a predetermined range by heating the ashless coal, thereby making it possible to provide a high-purity carbon material that is enhanced in the self-sinterability, kept from expansion even when treated for carbonization, free of cracking, chipping or powdering, and capable of maintaining the shape formed.

PRIOR ART DOCUMENTS

Patent Documents

Patent Document 1: JP-A-2001-26791
Patent Document 2: JP-A-2009-144130

SUMMARY OF THE INVENTION

Problems that the Invention is to Solve

Thanks to the technique described in Patent Document 2, ashless coal can be used as a carbon raw material having self-sinterability and an increase in the purity of a carbon material can be achieved, but there is room for improvement as to the density. That is, when ashless coal after decreasing the volatile matter content is used, deformability following carbonization shrinkage caused due to transpiration of moisture, etc. during carbonization (high-temperature heating) is low, giving rise to a problem that a void is formed in the carbon material to make the density low.

The present invention has been made by focusing on the matters described above, and an object of the present invention is to provide a method for producing a carbon material having a high purity and a high density, and a carbon material having a high purity and a high density.

Means for Solving the Problems

The method for producing a carbon material in the present invention which can solve the problems includes: an oxidation step of oxidizing an ashless coal; a forming step of mixing an oxidized ashless coal obtained in the oxidation step and an unoxidized ashless coal and forming a mixture thereof; and a carbonization step of carbonizing a formed body obtained in the forming step, in which percentage of increase in oxygen of the oxidized ashless coal obtained in the oxidation step is from 2.0 to 10.0%, and a mixing ratio of the oxidized ashless coal in the forming step is from 60 to 95 parts by mass per 100 parts by mass of a total of the oxidized ashless coal and the unoxidized ashless coal.

In the present invention, preferable embodiments includes the case where the oxidation is an air oxidation, and the case where the oxidation is performed at a temperature of 150° C. or more and less than an ignition point of the ashless coal.

In addition, embodiments of the present invention includes the carbon material obtained by mixing an oxidized ashless coal and an unoxidized ashless coal, forming a mixture thereof to form a formed body and carbonizing the formed body, in which percentage of increase in oxygen of the oxidized ashless coal is from 2.0 to 10.0%, and a ratio of the oxidized ashless coal in the formed body is from 60 to 95 parts by mass per 100 parts by mass of a total of the oxidized ashless coal and the unoxidized ashless coal.

Advantageous Effects of the Invention

According to the production method in the present invention, a carbon material having a high purity and a high density can be produced at a low cost. In particular, a carbon material where oxidized ashless coal obtained by applying an oxidation treatment to ashless coal is blended under predetermined conditions, is used, whereby a carbon material having a high purity and a high density can be provided.

MODE FOR CARRYING OUT THE INVENTION

Figure 1:
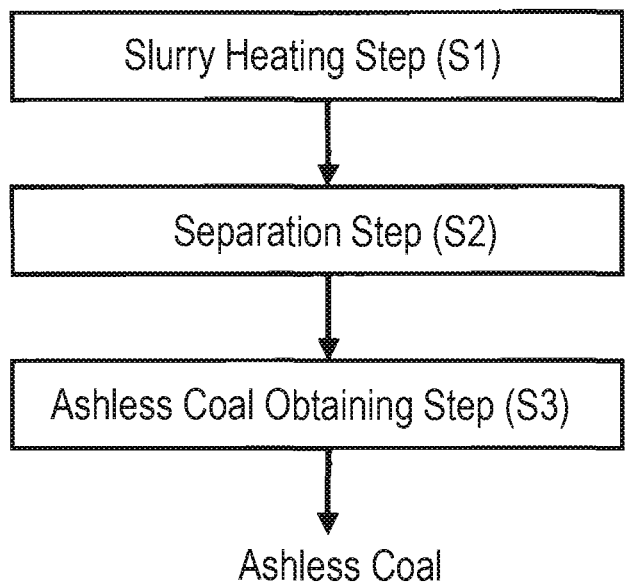
FIG. 1 is a flow chart for explaining an example of the production process of ashless coal.

The present inventors have made many intensive studies in order to provide a high-purity, high-density carbon material by using ashless coal as a carbon raw material. First, in view of increasing the purity, it is preferable to use ashless coal for a carbon raw material, but since the thermoplasticity or expansibility of ashless coal is high as described above, a high-purity and high-density carbon material cannot be produced only by use of ashless coal. In addition, when the volatile matter content of ashless coal is adjusted as in Patent Document 2, the thermoplasticity or expansibility may be improved, but a void is formed during carbonization treatment, giving rise to a problem that a sufficient increase in the density cannot be achieved.

Then, the present inventors had studied on a carbon raw material ensuring that void formation during a carbonization treatment is suppressed while reducing the thermoplasticity and expansibility of ashless coal and an increase in the density of a carbon material can be achieved.

As a result, it was found to be effective to use a mixed carbon raw material where the main component (aggregate component) is oxidized ashless coal obtained by applying an oxidation treatment to ashless coal and ashless coal not subjected to an oxidation treatment (unoxidized ashless coal) is further blended as a binder component. More specifically, it was found that the thermoplasticity and expansibility can be improved by oxidizing ashless coat. However, since the oxidized ashless coal exhibits poor self-sinterability, the formed body formed using only oxidized ashless coal is very fragile and has a problem that when it is carbonized, cracking develops to cause partial disintegration and eventually powdering.

Then, studies were made on an additive material working out to a binder for enhancing the binding of oxidized ashless coal particles with each other. In the case where an additive material conventionally employed as a binder, such as pitch, is blended, the above-described problem such as cracking or powdering may be improved, but since the carbonization shrinkage factor is higher than that of the oxidized ashless coal and in addition, the actual carbon ratio is low, there is a problem that a void remains in the carbon material or an ash derived from the binder component is mixed to decrease the purity.

The present inventors further made studies on an additive material, and as a result, it has been found that when the produced ashless coal not subjected to a modification treatment such as oxidation treatment (hereinafter, sometimes referred to as "unmodified ashless coal") is directly blended as a binder component, the unmodified ashless coal is thermoplasticized and functions as a binder for binding oxidized ashless coal particles, thereby improving the above-described problem such as cracking or powdering, and the shape of the formed body can be maintained. In particular, the carbonization shrinkage factor of the unmodified ashless coal is substantially the same as that of the oxidized ashless coal, so that void formation due to carbonization shrinkage can be suppressed and a high density can be achieved.

On the basis of this knowledge, it has been found that a high-purity and high-density carbon material can be provided by using a mixed raw material coal where oxidized ashless coal as a carbon raw material is the main component and unmodified ashless coal is blended as a binder component. The present invention has been accomplished based on this finding.

Figure 2:
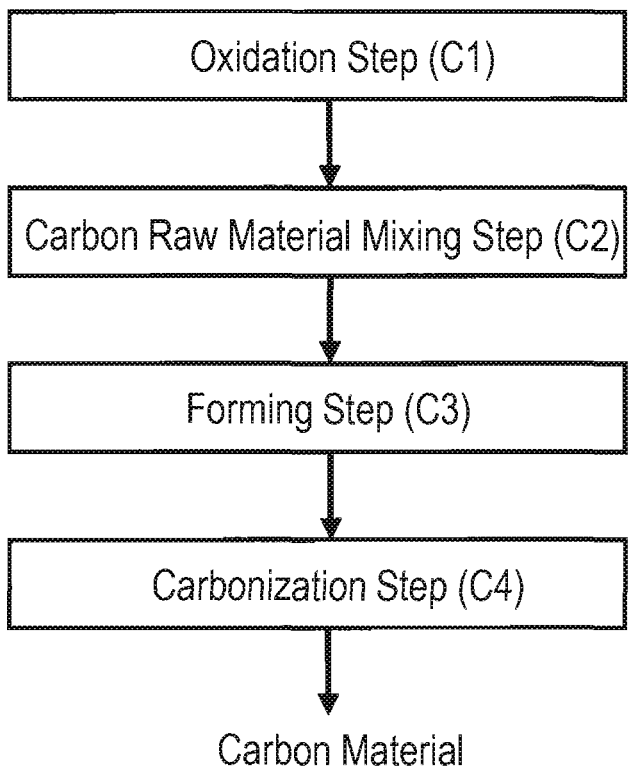
FIG. 2 is a flow chart for explaining an example of the production process of the carbon material according to the present invention.

The production method of a carbon material according to the present invention is described below by referring to the process charts illustrated in FIGS. 1 and 2.

First, a carbon raw material as the raw material of the carbon material in the present invention is described. In the present invention, a mixed carbon raw material where oxidized ashless coal obtained by applying an oxidation treatment to ashless coal and unoxidized ashless coal (unmodified ashless coal) are blended, is used as the carbon raw material. Ashless coal indicates coal where when the coal is heated and ashed at 815° C., the ash concentration of the residual inorganic material (e.g., silicic acid, alumina, iron oxide, lime, magnesia, alkali metal) is very low. Specifically, the ashless coal indicates coal having an ash concentration of 5,000 ppm or less (on the mass basis), preferably 2,000 ppm or less. In addition, the ashless coal is absolutely water-free and exhibits higher thermal fluidity than raw material coal.

In the present invention, existing ashless coal having such a property can be used. The production method thereof is not particularly limited, and various conventional production methods can be employed. For example, the ashless coal can be produced through the steps S1 to S3 below (see, FIG. 1), and the following process for producing ashless coal (S1 to S3) may be appropriately changed, and various treatment steps may be added, if desired.

For example, in the production of ashless coal, as long as each of the above-described steps is not adversely affected, other steps, e.g., a coal pulverization step of pulverizing the raw material coal, a removal step of removing an unwanted material such as refuse, or a drying step of drying the obtained ashless coal, may be provided between respective steps above or before or after each step.

<Slurry Heating Step: S1>

The slurry heating step (S1) is a treatment of mixing coal and an aromatic solvent to prepare a slurry and heat-treating the slurry to extract the coal component in the aromatic solvent.

The kind of the coal as a raw material (hereinafter, sometimes referred to as "raw material coal") is not particularly limited. In view of profitability, it is more preferable to use low rank coal, for example, non- or slightly-caking coal substantially free of thermoplasticity, steam coal, or low-grade coal, i.e., brown coal, lignite or subbituminous coal, than to use high-grade coal such as bituminous coal.

The aromatic solvent is not particularly limited as long as it is a solvent having a property of dissolving coal. Examples of the aromatic solvent having such a property include a monocyclic aromatic compound such as benzene, toluene and xylene, and a bicyclic aromatic compound such as naphthalene, methylnaphthalene, dimethylnaphthalene and trimethylnaphthalene. In addition, examples of the bicyclic aromatic compound include aliphatic side chain-containing naphthalenes, biphenyl, and a long-chain aliphatic side chain-containing alkylbenzene. In the present invention, a bicyclic aromatic compound that is a non-hydrogen-donating solvent, is preferred.

The non-hydrogen-donating solvent is a coal derivative that is a solvent primarily purified from a carbonization product of coal and mainly composed of a bicyclic aromatic compound. The reason why a non-hydrogen-donating solvent is preferred is that the non-hydrogen-donating solvent is stable even in a heated state and excellent in the affinity for coal and therefore, the ratio of a coal component in the solvent (hereinafter, sometimes referred to as "extraction percentage") is high and in addition, because the solvent can be easily recovered by distillation or other methods and furthermore, the solvent recovered can be cyclically used.

If the boiling point of the aromatic solvent is too low, the pressure required during heating extraction or in the later-described separation step (S2) would be high, and the loss due to volatilization in the step of recovering the aromatic solvent is increased, leading to a decrease in the recovery ratio of the aromatic solvent. Furthermore, a decrease in the extraction percentage during heating extraction is caused. On the other hand, if the boiling point of the aromatic solvent is too high, separation of the aromatic solvent from a liquid component or a solid component in the separation step (S2) is difficult, and the recovery ratio of the solvent lowers. The boiling point of the aromatic solvent is preferably from 180 to 330° C.

The coal concentration relative to the aromatic solvent is not particularly limited. Although it may vary depending on the kind of the raw material coal, if the coal concentration relative to the aromatic solvent is low, the ratio of the coal component extracted in the aromatic solvent to the amount of the aromatic solvent would be small, and this is not profitable. On the other hand, a higher coal concentration is better, but if the coal concentration is excessively high, the slurry viscosity would be increased, and transfer of the slurry or separation between a liquid component and a solid component in the separation step (S2) is likely to become difficult. The coal concentration is preferably from 10 to 50 mass %, more preferably from 20 to 35 mass %, on the dry coal basis.

If the heat treatment (heating extraction) temperature of the slurry is too low, the bonding between molecules constituting the coal cannot be sufficiently weakened, and in the case of using low rank coal as the raw material coal, the resolidification temperature of the ashless coal obtained in the later-described ashless coal obtaining step (S3) cannot be elevated. On the other hand, if the heat treatment temperature is too high, the pyrolytic reaction of the coal would be very active to cause recombination of pyrolytic radicals produced, leading to a decrease in the extraction rate. The slurry heating temperature is preferably 350° C. or more, more preferably 380° C. or more, and preferably 420° C. or less.

The heating time (extraction time) is not particularly limited, but if the extraction time is long, the pyrolysis reaction proceeds excessively, allowing for the progress of a radical polymerization reaction, and the extraction ratio lowers. For example, at the above heating temperature, the heating time is preferably 120 minutes or less, more preferably 60 minutes or less, still more preferably 30 minutes or less, and preferably more than 0 minute, more preferably 10 minutes or more.

After the heating extraction, the extract is preferably cooled to 370° C. or less so as to suppress a pyrolysis reaction. The lower limit of the temperature when cooling is preferably 300° C. or more. If cooled to less than 300° C., the dissolving power of the aromatic solvent is reduced, and reprecipitation of the once extracted coal component occurs, leading to a decrease in the yield of ashless coal.

The heating extraction is preferably performed in a non-oxidizing atmosphere. Specifically, the heating extraction is preferably performed in the presence of an inert gas such as nitrogen. This is because contact with oxygen during heating extraction is risky due to a fear of ignition and when hydrogen is used, the cost rises.

The pressure in the heating extraction may vary depending on the temperature during heating extraction or the vapor pressure of the aromatic solvent to be used, but if the pressure is lower than the vapor pressure of the aromatic solvent, the aromatic solvent is vaporized and not confined in a liquid phase, and extraction cannot be achieved. On the other hand, if the pressure is too high, the equipment cost and operation cost are increased, and this is not profitable. The preferable pressure is generally from 1.0 to 2.0 MPa.

<Separation Step (S2)>

The separation step (S2) is a step of separating the slurry heat-treated in the slurry heating step (S1) into a liquid component and a solid component. The liquid component is a solution containing the coal component extracted in the aromatic solvent. The solid component is a slurry containing ash insoluble in the aromatic solvent and insoluble coal.

The method for separating the slurry into a liquid component and a solid component in the separation step (S2) is not particularly limited, and a conventional separation method such as filtration method, centrifugal separation method and gravity settling method, may be employed. In the present invention, it is preferable to use a gravity settling method enabling continuous operation of a fluid and being low-costly and suitable for treatment of a large amount. In the case of employing a gravity settling method, a liquid component (hereinafter, sometimes referred to as "supernatant liquid") that is a solution containing a coal component extracted in the aromatic solvent can be obtained from the upper part of a gravity settling tank, and a solid component (hereinafter, sometimes referred to as "solid content concentrate") that is a slurry containing solvent-insoluble ash and coal can be obtained from the lower part of the gravity settling tank.

Subsequently, as described below, the aromatic solvent is separated and recovered from the supernatant liquid and the solid content concentrate by using a distillation method, etc., and as a result, ashless coal having a very low ash concentration can be obtained from the supernatant liquid (ashless coal obtaining step (S3)).

<Ashless Coal Obtaining Step (S3)>

The ashless coal obtaining step (S3) is a step of separating the aromatic solvent from the supernatant liquid to obtain ashless coal having a very low ash concentration.

The method for separating the aromatic solvent from the supernatant liquid is not particularly limited, and a general distillation method, evaporation method (e.g., spray drying method), etc. can be used. The aromatic solvent recovered by separation can be repeatedly used. By the separation and recovery of the aromatic solvent, ashless coal can be obtained from the supernatant liquid.

<Other Steps>

If desired, a byproduct coal in which the ash is concentrated may be produced by separating the aromatic solvent from the solid content concentrate (byproduct coal obtaining step). As the method for separating the aromatic solvent from the solid content concentrate, a general distillation or evaporation method can be used, similarly to the above-described ashless coal obtaining step (S3) of obtaining ashless coal from a liquid component.

The method for producing a carbon material in the present invention is described below by referring to FIG. 2. In the production of a carbon material, as long as each step is not adversely affected, other steps, e.g., a pulverization step of pulverizing various raw materials, etc., a removal step of removing an unwanted material such as refuse, or a step of applying various treatments to the obtained carbon material, may be provided between respective steps or before or after each step.

<Oxidation Step: C1>

The oxidation step (C1) is a step of oxidizing ashless coal, and in this step, oxidized ashless coal is obtained. In the present invention, as described later, unmodified ashless coal and oxidized ashless coal obtained in the oxidation step are mixed, and the mixture is used as the carbon raw material (hereinafter, sometimes referred to as "mixed carbon raw material"). Therefore, while a part of the prepared ashless coal is oxidized in the oxidation step (C1) to produce oxidized ashless coal, the remaining unmodified ashless coal may be mixed with the oxidized ashless coal.

By applying oxidation treatment to ashless coal, the later-described melting or expansion can be suppressed, which contributes to a high density of the carbon material. In order to obtain such an effect, it is necessary to adjust the percentage of increase in oxygen of the oxidized ashless coal (oxygen content percentage of the oxidized ashless coal-oxygen content percentage of the ashless coal before oxidation) to 2.0% or more and 10.0% or less by measuring the oxygen content percentage of ashless coal before and after oxidation treatment according to JIS M 8813 (Calculation Method of Oxygen Content Percentage).

If the percentage of increase in oxygen of the oxidized ashless coal is less than 2.0%, the ashless coal is not sufficiently modified, and melting or expansion occurs during carbonization to deform the shape or make the carbon material porous, leading to a decrease in the density. On the other hand, if the percentage of increase in oxygen of the oxidized ashless coal exceeds 10.0%, the carbonization shrinkage factor when carbonized is reduced to cause a difference in the carbonization shrinkage factor between oxidized ashless coal and unmodified ashless coal and allow void formation, and as a result, the desired high density cannot be achieved. The percentage of increase in oxygen of the oxidized ashless coal is preferably 4.0% or more, more preferably 6.0% or more, and preferably 9.0% or less, more preferably 8.5% or less.

The method for oxidizing ashless coal is not particularly limited, and the ashless coal may be oxidized such that the percentage of increase in oxygen falls in a predetermined range. Examples of the method for oxidation include oxidation under an oxidizing atmosphere such as oxygen, ozone, nitrogen dioxide and air, and preferable examples thereof include air oxidation using oxygen in air as an oxidizer. In view of the cost, oxidation under an air atmosphere is more preferred.

The oxidation temperature (temperature kept during oxidation) may be appropriately adjusted so that the desired percentage of increase in oxygen can be obtained. If the oxidation temperature is low, the ashless coal may be insufficiently oxidized, and the above-described modification effect may not be fully exerted. In addition, if the oxidation temperature is low, a long time is required to achieve the desired percentage of increase in oxygen, and the productivity is reduced. On the other hand, if the oxidation temperature is too high, the oxidation rate is excessively increased, and the oxidation degree of ashless coal can be hardly controlled. The oxidation temperature is preferably 150° C. or more, more preferably 200° C. or more, and preferably less than the ignition point of ashless coal, more preferably 350° C. or less.

The oxidation time (holding time at a predetermined temperature) may be appropriately adjusted so that the desired percentage of increase in oxygen can be obtained. If the oxidation time is short, the ashless coal may be insufficiently oxidized. On the other hand, if the oxidation time is long, the ashless coal may be excessively oxidized, allowing void formation to cause a decrease in the density. For example, the oxidation time in the above-described temperature range is preferably 0.5 hours or more, more preferably 1 hour or more, and preferably 6 hours or less, more preferably 3 hours or less. After the oxidation, the oxidized ashless coal may be left standing to cool to room temperature.

The particle diameter (equivalent-circle diameter; hereinafter, the same applies to the particle diameter) is not particularly limited. If the particle diameter of ashless coal is too large, the inside of the ashless coal may not be sufficiently oxidized, leaving a fear of occurrence of melting, etc. when carbonized. On the other hand, if the particle diameter of ashless coal is too small, the handling property is deteriorated. The average particle diameter of the ashless coal is preferably 3 mm or less, more preferably 1 mm or less, and preferably 0.2 mm or more, more preferably 0.3 mm or more. From the standpoint of accelerating the oxidation, the maximum particle diameter of ashless coal to be oxidized is also preferably 3 mm or less, more preferably 1 mm or less, still more preferably 0.5 mm or less.

Next, the ashless coal obtained in the oxidation step and unmodified ashless coal (i.e., unoxidized ashless coal) are mixed, and the mixture is formed in a desired shape to obtain a formed body. In the following, mixing of ashless coals (carbon raw material mixing step: C2) and forming (forming step: C3) are individually described as separate steps, but these may also be performed by regarding them as a continuous one step.

<Carbon Raw Material Mixing Step: C2>

The carbon raw material mixing step is a step of mixing the oxidized ashless coal obtained in the oxidation step (C1) and unmodified ashless coal to obtain a carbon material (mixed carbon raw material). As described above, by blending oxidized ashless coal and unmodified ashless coal, not only melting or expansion during carbonization can be suppressed but also void formation in the carbon material can be suppressed and therefore, the blending contributes to a high density of the carbon material.

In order to obtain such an effect, the ratio of the oxidized ashless coal in the mixed carbon raw material must be from 60 to 95 parts by mass per 100 parts by mass of the total of oxidized ashless coal and unmodified ashless coal. If the mixing ratio of oxidized ashless coal is high and in turn, the ratio of unmodified ashless coal is low, the binder effect of the unmodified ashless coal is not sufficiently exerted, and the raw material becomes fragile and is partially disintegrated into powder due to cracking, etc. developed when carbonized, resulting in poor shape retentivity. On the other hand, if the mixing ratio of unmodified ashless coal is high and in turn, the mixing ratio of oxidized ashless coal is low, the unmodified ashless coal is expanded when carbonized, and a carbon material having a desired shape cannot be obtained. The mixing ratio of the oxidized ashless coal is preferably from 80 to 90 parts by mass.

The average particle diameter of the unmodified ashless coal to be mixed with the oxidized ashless coal is not particularly limited, but if the average particle diameter is too large, a non-uniformity may be produced in the mixed state in a formed body, making it impossible to sufficiently exert the effect in some cases. On the other hand, if the average particle diameter is too small, the handling property may be deteriorated. The average particle diameter of the unmodified ashless coal is preferably 1.0 mm or less, more preferably 0.5 mm or less, and preferably 0.1 mm or more, more preferably 0.2 mm or more. If the maximum particle diameter of the unmodified ashless coal is too large, a non-uniformity may be produced in the mixed state in a formed body, and for this reason, the maximum diameter is preferably 1.0 mm or less, more preferably 0.5 mm or less.

In addition, the average particle diameter of the unmodified ashless coal is preferably smaller than the average particle diameter of the oxidized ashless coal, because the above-described effects of the present invention are more enhanced.

The method for mixing the oxidized ashless coal and the unmodified ashless coal is not particularly limited, and a conventional method of ensuring uniform mixing may be employed. For example, a mixer, a kneader, a single-shaft mixer, or a double-screw mixer may be used.

<Forming Step: C3>

The forming step is a step of forming the mixed carbon raw material obtained in the carbon raw material mixing step (C2) into a desired shape to obtain a formed body. The method for obtaining a formed body is not particularly limited and examples thereof include a method using a double roll (twin roll)-type forming machine by means of flat roll or a double roll-type forming machine having an almond-shaped pocket, a method using a single-shaft press- or roller-type forming machine or an extrusion forming machine, and press forming by means of a mold, and any of these methods can be employed.

Forming of the mixed carbon raw material may be cold forming that is performed at around room temperature, but is preferably hot forming that is performed under heating. When the mixed carbon raw material of oxidized ashless coal and unmodified ashless coal is formed under pressure at a high temperature, the unmodified ashless coal is plastically deformed to fill a void between oxidized ashless coal particles, so that a more highly densified formed body can be obtained. In turn, a carbon material having a higher density can be obtained by carbonizing the highly densified formed body. On the other hand, if the forming temperature is too high, the unmodified ashless coal may be softened and expanded, failing in achieving a high density. The hot forming temperature (mold temperature) is preferably 100° C. or more, more preferably 200° C. or more, and preferably 450° C. or less, more preferably 300° C. or less. The forming pressure is not particularly limited, and conventional conditions may be employed. For example, the forming pressure is approximately from 0.5 to 3 ton/cm².

<Carbonization Step: C4>

The carbonization step is a step of carbonizing the formed body obtained in the forming step to obtain a carbon material.

Carbonization of the formed body is performed by heating the formed body in a non-oxidizing atmosphere. Specifically, the formed body is charged into an arbitrary heating device such as electric furnace and after replacing the inside with a non-oxidizing gas, heating is performed while blowing a non-oxidizing gas into the device. With the heating, the unmodified ashless coal is softened, melted and resolidified and is thereby carbonized together with the oxidized ashless coal.

The heating conditions may be appropriately set according to the properties required of a product and are not particularly limited, but the heating is preferably performed at a temperature of preferably 500° C. or more, more preferably 700° C. or more, for approximately from 0.5 to 10 hours. The temperature rise rate to the heating temperature is not particularly limited and usually, the temperature may be raised at a rate of approximately from 0.01 to 1° C./min. The upper limit of the heating temperature is not particularly limited and may be appropriately determined according to the equipment, etc., and, for example, as the upper limit, it may be preferably 3,000° C. or less, more preferably 2,600° C. or less.

The carbonization atmosphere is preferably a non-oxidizing gas atmosphere so as to prevent deterioration of the coal due to oxidation. Since carbonization is allowed to proceed in a state where oxidation of the carbon material is suppressed, the kind of the non-oxidizing gas is not particularly limited as long as the gas does not contain an oxidizing gas, but the gas is preferably an inert gas, more preferably a nitrogen gas.

The thus-obtained carbon material has a higher purity and a higher density than conventionally known carbon materials. Specifically, the carbon material is of high purity with an ash content of preferably 5,000 ppm or less, more preferably 3,000 ppm or less, and high density with a density of preferably 1.50 g/ml or more, more preferably 1.60 g/ml or more, still more preferably 1.70 g/ml or more. In addition, the carbon material in the present invention is free of crazing or cracking and maintains the shape of a formed body before carbonization, without undergoing expansion, deformation or powdering.

The carbon material in the present invention after carbonization of a formed body obtained by performing forming of a mixture where oxidized ashless coal oxidized to the above-described predetermined percentage of increase in oxygen (in the range of 2.0 to 10.0%) and unoxidized ashless coal are mixed in the above-described predetermined ratio (from 60 to 95 parts by mass of oxidized ashless coal per 100 parts by mass of the total of oxidized ashless coal and unoxidized ashless coal), has a high purity and a high density, as compared with conventional carbon materials.

EXAMPLES

The present invention is described more specifically below by referring to Examples, but the present invention is, of course, not limited to the following Examples and may be carried out by appropriately making changes as long as they are in conformity to the gist described hereinabove and hereinafter, all of which are included in the technical scope of the present invention.

(Production of Ashless Coal)
(Slurry Heating Step: S1)

With 5 kg of raw material coal (bituminous coal), an aromatic solvent (1-methylnaphthalene (produced by Nippon Steel Chemical Co., Ltd.)) in an amount (20 kg) four times that of the raw material coal was mixed to prepare a slurry. This slurry was pressurized with nitrogen of 1.2 MPa and subjected to a heat treatment (heating extraction) in an autoclave having an internal volume of 30 liter under the conditions of 370° C. and 1 hour.

(Separation Step: S2)

The obtained slurry was separated into a supernatant liquid and a solid content concentrate in a gravity settling tank maintained at the same temperature and pressure.

(Ashless Coal Obtaining Step: S3)

The obtained supernatant liquid was further filtered (stainless mesh filter with an opening size of 1 μm) to obtain an ashless coal solution. The aromatic solvent was separated and recovered from the ashless coal solution to produce ashless coal (Carbon Raw Material A1).

(Measurement of Ash Concentration)

This ashless coal (Carbon Raw Material A1) was measured for the ash concentration by the method specified in JIS M 8812. As a result, the ash concentration of the ashless coal was 0.07 mass % (700 ppm).

(Production of Carbon Material)

Carbon materials of sample Nos. 1 to 11 were produced using the ashless coal (Carbon Raw Material A1).

(Oxidation Step: C1)

A part of the ashless coal (Carbon Raw Material A1) produced above was pulverized so as to pass through a sieve having an opening size of 0.5 mm. The pulverized ashless coal was heated in an air atmosphere to a predetermined temperature shown in Table 1 and held at the same temperature for a predetermined time, thereby performing an oxidation treatment of the ashless coal (in Table 1, "Oxidation Conditions"). After the oxidation treatment, the ashless coal was cooled to room temperature to produce oxidized ashless coal (Carbon Raw Material B). Here, the oxygen concentration of the ashless coal (at room temperature) before and after the oxidation treatment was measured according to JIS M 8813, and the percentage of increase in oxygen of the oxidized ashless coal was calculated. The results are shown in Table 1 (in Table 1, "Percentage of Increase in Oxygen").

(Carbon Raw Material Mixing Step: C2)

Ashless coal (Carbon Raw material A2) obtained by pulverizing the above-described ashless coal (Carbon Raw Material A1) so as to pass a sieve having an opening size of 0.5 mm and the oxidized ashless coal (Carbon Raw Material B) produced above were mixed in a predetermined ratio shown in Table 1 (in Table 1, "Blending Ratio of Oxidized Ashless Coal") to obtain a mixed carbon raw material (Carbon Raw Material C). Here, as for sample No. 6, a formed body was produced in the same manner as other samples except for using only the pulverized ashless coal (Carbon Raw Material A2) and carbonized to produce a carbon material.

(Forming Step: C3)

A mold (cylindrical cavity of 30 mm in diameter) held at a temperature shown in Table 1 (in Table 1, "Forming Temperature") was filled with 5 g of the mixed carbon raw material obtained above, followed by press forming at a pressure of 3 ton/cm$^2$ (holding time: 1 minute) to produce a formed body having a thickness of 7.1 mm.

(Carbonization Step: C4)

The formed body obtained above was heated to 1,000° C. at a rate of 0.5° C./min in a nitrogen atmosphere and held at that temperature for 5 hours to perform carbonization, thereby obtaining carbon materials (sample Nos. 1 to 11).

(Evaluation Method)
(Observation of Outer Appearance of Carbon Material)

With respect to each of the carbon materials produced above, the outer appearance was observed with an eye and evaluated. Specifically, occurrence of expansion, cracking, chipping or powdering in the carbon material was observed. In addition, whether the shape of the carbon material maintained the shape of the formed body was observed.

(Density of Formed Body and Carbon Material)

The formed body and the carbon material were measured for the apparent specific gravity (density). The results obtained are shown in Table 1. In this Example, the increase in density was judged as passed (fair) when the density is higher than the case of the conventional example (sample No. 6), judged as good (A) when the density of the carbon material is preferably 1.50 g/ml or more, and judged as excellent (AA) when the density is more preferably 1.60 g/ml or more.

TABLE 1

| Sample No. | Oxidation Conditions (temperature, time) | Percentage of Increase in Oxygen (%) | Blending Ratio of Oxidized Ashless Coal (*1) | Forming Temperature (° C.) | Density of Formed Body (g/ml) | Carbon Material Density (g/ml) | Carbon Material Outer Appearance |
|---|---|---|---|---|---|---|---|
| 1 | 200° C., 1 hr | 6.1 | 90 | 200 | 1.25 | 1.65 | good |
| 2 | 200° C., 1 hr | 6.1 | 95 | 200 | 1.22 | 1.62 | good |
| 3 | 200° C., 1 hr | 6.1 | 96 | 200 | 1.21 | — | powdering |
| 4 | 200° C., 1 hr | 6.1 | 60 | 200 | 1.26 | 1.65 | good |
| 5 | 200° C., 1 hr | 6.1 | 55 | 200 | 1.26 | 1.32 | expansion, deformation |
| 6 | — | — | — | 200 | 1.25 | 0.55 | expansion, deformation |
| 7 | 150° C., 1 hr | 1.8 | 95 | 200 | 1.24 | 0.59 | expansion, deformation |
| 8 | 200° C., 5 hr | 10.6 | 95 | 200 | 1.22 | 1.43 | void was observed |
| 9 | 200° C., 1 hr | 6.1 | 90 | 100 | 1.21 | 1.52 | low density |
| 10 | 200° C., 3 hr | 8.2 | 95 | 200 | 1.24 | 1.61 | good |
| 11 | 200° C., 1 hr | 6.1 | 85 | 200 | 1.25 | 1.66 | good |

(*1): The blending ratio of oxidized ashless coal is a ratio (parts by mass) per 100 parts by mass of the total of oxidized ashless coal and unmodified ashless coal.

As shown in Table 1, in sample Nos. 1, 2, 4 and 9 to 11 satisfying the predetermined requirements of the present invention, the outer appearance of the carbon material was free of cracking, chipping or powdering and the shape of the formed body was maintained. The obtained carbon material was of high purity with an ash concentration of 5,000 ppm or less, and the density thereof was higher than the case of the conventional example. In sample Nos. 1, 2, 4, 10 and 11 where the forming temperature was higher than the case of the sample No. 9, the density was higher (1.60 g/ml or more).

Sample No. 3 is a case where the blending ratio of the oxidized ashless coal was high. In this case, the density of the formed body was low, and not only cracking was developed when carbonized but also partial disintegration into powder occurred, and as a result, the shape of the formed body could not be maintained. In sample No. 3, the shape of the carbon material collapsed and therefore, the density was not measured.

Sample No. 5 is a case where the blending ratio of the unmodified ashless coal was high. In this case, the formed body was foamed and expanded during the carbonization of the formed body, and the shape was deformed. In addition, the carbon material was porous, and the density was low.

Sample No. 6 is a case where the oxidized ashless coal was not blended (a case where only the unmodified ashless coal was used). In this case, the formed body was vigorously foamed and expanded during the carbonization of the formed body, and the shape was deformed. In addition, the carbon material was porous, and the density was low.

Sample No. 7 is a case where the oxidation time for the oxidation temperature was short and therefore, the percentage of increase in oxygen was low. In this case, the formed body was foamed and expanded during the carbonization of the formed body, and the shape was deformed. In addition, the carbon material was porous, and the density was low.

Sample No. 8 is a case where the percentage of increase in oxygen was high. In this case, voids were produced due to carbonization shrinkage during the carbonization, and as a result, the carbon material was porous and the density was low.

While the present invention has been described in detail and with reference to specific embodiments thereof, it will be apparent to one skilled in the art that various changes and modifications can be made therein without departing from the spirit and scope of the invention.

This application is based on Japanese Patent Application No. 2013-188208 filed on Sep. 11, 2013, the entire of which is incorporated herein by way of reference.

The invention claimed is:

1. A method for producing a carbon material, the method comprising
    oxidizing an ashless coal to obtain an oxidized ashless coal;
    mixing the oxidized ashless coal and an unoxidized ashless coal and forming a mixture thereof, to obtain a formed body; and
    carbonizing the formed body to obtain a carbon material, wherein:
    a percentage of increase in oxygen of the oxidized ashless coal obtained in the oxidizing step is from 2.0 to 10.0%; and
    the oxidized ashless coal is mixed with the unoxidized ashless coal in an amount of from 60 to 95 parts by mass per 100 parts by mass of a total of the oxidized ashless coal and the unoxidized ashless coal.

2. The method according to claim 1, wherein the oxidation is an air oxidation.

3. The method according to claim 2, wherein the oxidation is performed at a temperature of 150° C. or more and less than an ignition point of the ashless coal.

4. The method according to claim 1, wherein the oxidation is performed at a temperature of 150° C. or more and less than an ignition point of the ashless coal.

5. The method according to claim 1, wherein the oxidized ashless coal is mixed with the unoxidized ashless coal in an amount of from 80 to 90 parts by mass per 100 parts by mass of a total of the oxidized ashless coal and the unoxidized ashless coal.

6. The method according to claim 1, wherein the percentage of increase in oxygen of the oxidized ashless coal obtained in the oxidizing step is from 4.0 to 9.0%.

7. The method according to claim 1, percentage of increase in oxygen of the oxidized ashless coal obtained in the oxidizing step is from 6.0 to 8.5%.

8. The method according to claim 1, wherein the oxidizing is conducted at a temperature of from 150° C. to 350° C.

* * * * *